Aug. 17, 1965 S. STEPHAN 3,200,867
COMMINUTING AND MIXING ASSEMBLY
Filed July 16, 1963 2 Sheets-Sheet 1
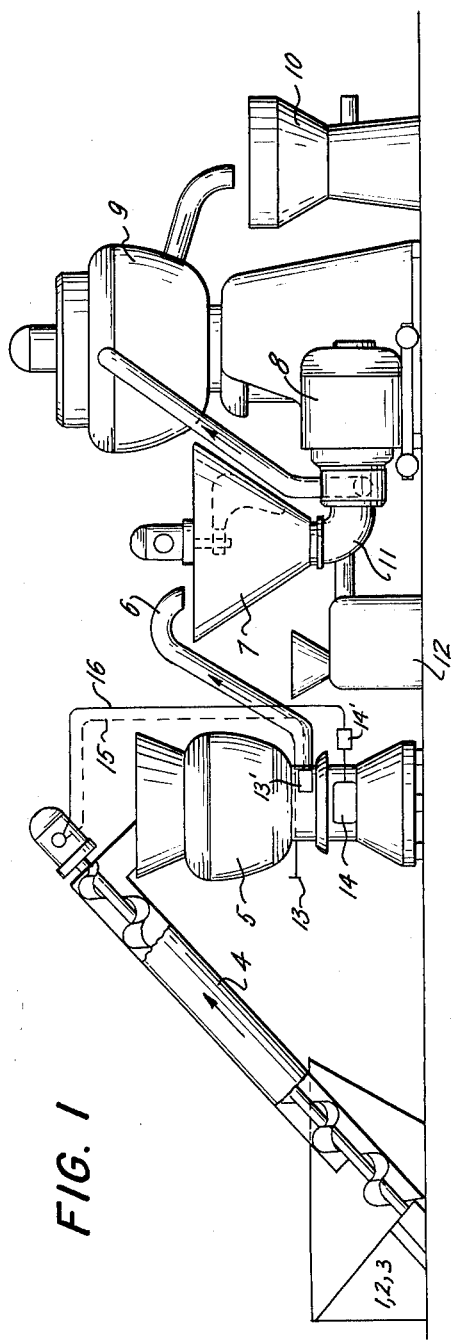
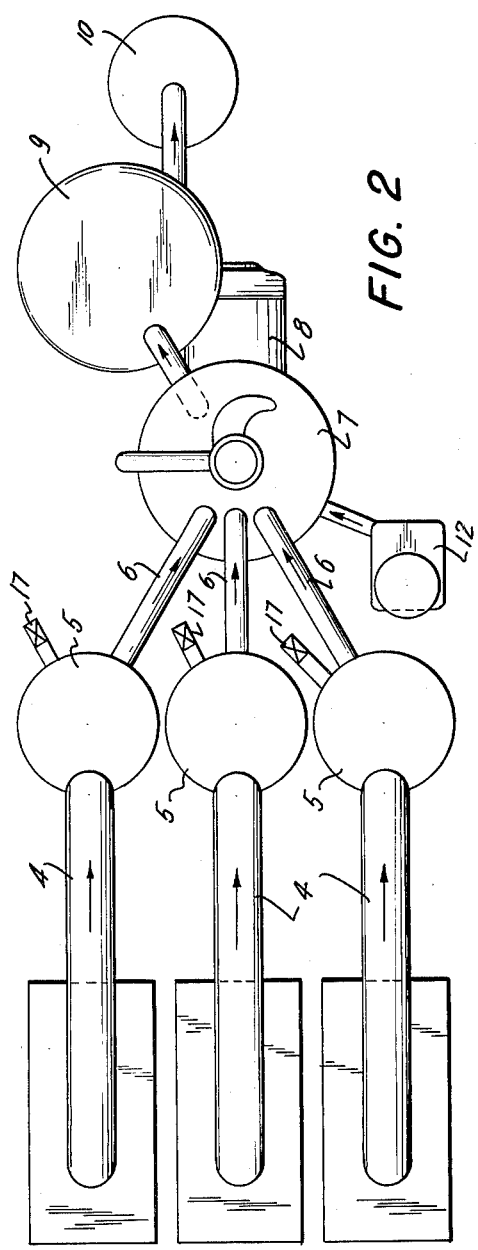
INVENTOR.
Siegfried Stephan
BY Michael S. Striker Aug. 17, 1965   S. STEPHAN   3,200,867
COMMINUTING AND MIXING ASSEMBLY
Filed July 16, 1963   2 Sheets-Sheet 2
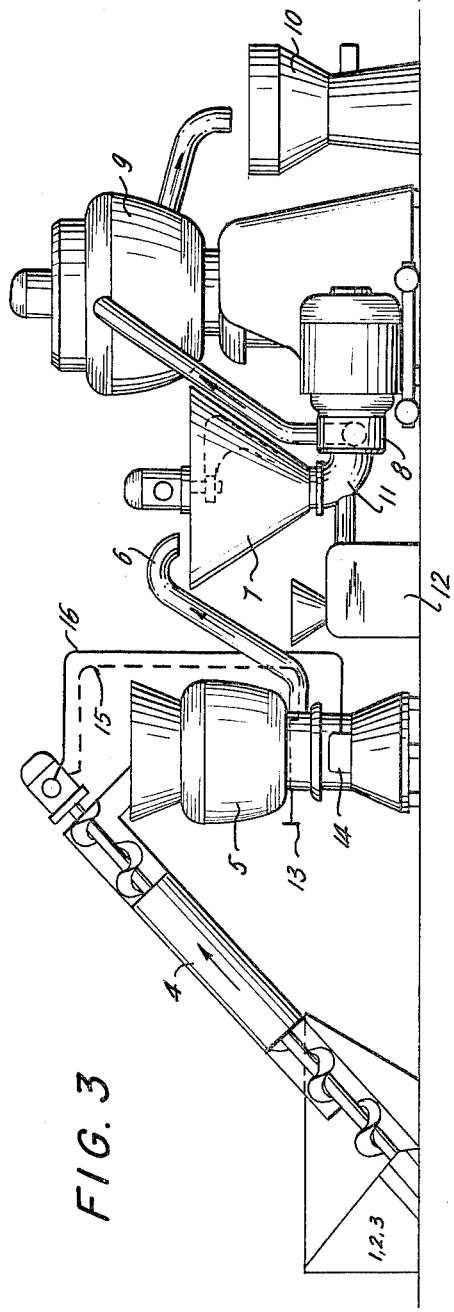
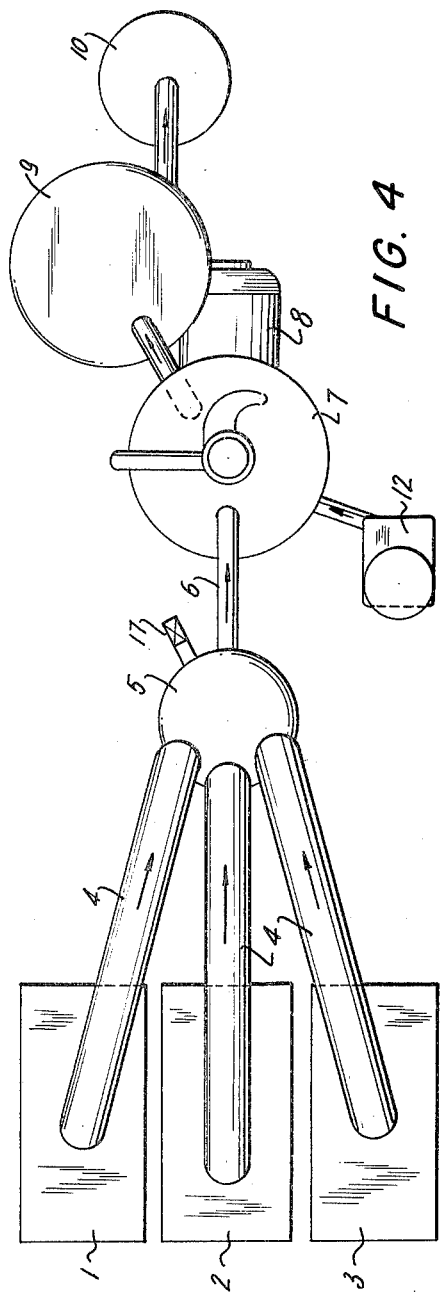
INVENTOR.
Siegfried Stephan
BY
Michael S. Striker

United States Patent Office 3,200,867
Patented Aug. 17, 1965

3,200,867
COMMINUTING AND MIXING ASSEMBLY
Siegfried Stephan, Hameln (Weser), Germany, assignor, by mesne assignments, to Belder Trust reg, Vaduz, Liechtenstein
Filed July 16, 1963, Ser. No. 295,415
Claims priority, application Germany, July 16, 1962, St 19,486
9 Claims. (Cl. 146—192)

The present invention relates to comminuting and mixing assemblies particularly for comminuting and mixing various food ingredients in order to provide a mixture of such ingredients in a finely comminuted and homogeneous condition.

Although structures of this general type are well developed at the present time, nevertheless the lack of manpower as well as the constantly increasing demand for products which results in ever increasing sizes in machines creates certain difficulties. Moreover, when mixing together various ingredients it is necessary from time to time, even from day to day, to change the proportions of the various ingredients in accordance with particular changes in tastes or flavors which are desired or in accordance with changes in prices of the various ingredients.

At the present time when it is desired, for example, to provide a mixture of various different types of meats, it is necessary to weigh the ingredients individually on one or more scales so as to provide the desired proportions between the ingredients, and then the thus-weighed ingredients are delivered to comminuting devices and the like which comminute and mix the ingredients and which might be undesirably large because of the great amounts of material which they may be required to handle under certain conditions.

It is accordingly a primary object of the present invention to provide a comminuting and mixing assembly which is extremely convenient to operate and which at the same time requires far less structure than conventional assemblies while capable of providing predetermined proportions of the various ingredients to each other in the final mixture thereof.

Another object of the present invention provides a structure which is capable of maintaining a desired, adjustable ratio between the various ingredients of a given mixture of ingredients while at the same time providing a thorough, homogeneous mixture thereof and providing the possibility for adding additional ingredients thereto.

It is also an object of the present invention to provide a structure wherein the rate of supply of the various ingredients to the assembly can be automatically controlled in accordance with the desired proportions of the ingredients to each other.

It is in particular an object of the present invention to provide a structure of the above type which is especially suited for comminuting different types of meats to provide a mixture of hamburger or the like capable of being made into a meat loaf, for example, or the like and wherein the proportions of the various ingredients of such a mixture are precisely regulated in an extremely exceedingly simple and convenient manner without preventing any change in the proportions whenever desired.

With these objects in view the invention includes, in a comminuting and mixing assembly, a plurality of supply means for respectively supplying the various ingredients to a common receiver means in which the supplied ingredients may be mixed together and/or further comminuted and in which further ingredients may be added, for example. In accordance with the present invention the plurality of supply means have operatively connected thereto a plurality of adjusting means, respectively, for adjusting the amounts of the ingredients respectively supplied by the plurality of supply means to the single receiving means, so that in this way the adjustment of the several supply means determines the ratio of the various ingredients to each other in the final mixture, and thus it becomes possible simply by adjusting the plurality of supply means to eliminate the necessity for delicate weighing scales which are inconvenient to operate and which cannot provide, unless extreme care is taken, the precise proportions of the various ingredients in the same way as the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1 and 2 are respectively elevation and plan views which diagrammatically show one possible embodiment of a structure according to the present invention; and FIGS. 3 and 4 are respectively elevational and plan views of another embodiment of the structure according to the present invention.

In the embodiment of FIGS. 1 and 2 there are shown three containers 1, 2, 3 which are respectively adapted to receive three different ingredients such as, for example, beef, pork and bacon. These ingredients are conveyed out of the receptacles 1, 2, 3 by the three conveyer means 4 which are in the form of screw conveyers respectively extending upwardly from the receptacles 1, 2, 3. As is apparent from FIG. 1, each of the screw conveyers is driven by its own independent electric motor and provides a separate conveying of the particular ingredient located in its particular receptacle. Therefore, these three ingredients will be separately conveyed by the three conveyer means 4.

A plurality of combined comminuting and mixing means 5 of any suitable well known construction are respectively located at the discharge ends of the several conveyer means 4 for receiving the ingredients respectively therefrom. Thus, the separate ingredients will be separately conveyed to separate comminuting and/or mixing means 5. A plurality of supply means respectively communicate with the several comminuting and mixing means 5 for receiving the several ingredients therefrom after they are comminuted and/or mixed therein, and the plurality of supply means in the example of FIGS. 1 and 2 take the form of a plurality of tubular conduits 6 into which the comminuted and mixed materials flow from the several comminuted and mixing means 5 to move along the several tubular supply means 6. A common receiver means 7 receives the several ingredients from the plurality of supply means 6 which respectively have discharge ends located over the open top end of the receiver 7 for discharging the several ingredients into the common receiver 7. A mixing means in the form of a rotary, driven mixing arm, for example, can mix the materials together within the receiving means 7, and a fine comminuting means 8 may communicate with the discharge of the receiving means 7 for receiving the mixed materials therefrom and further comminuting the mixture so that it has a finer consistency. From the fine comminuting means the mixed and further comminuted materials are delivered to a further mixer 9 which then delivers the thoroughly mixed ingredients to a receiver 10 which can further deliver the mixed ingredients to any desired location.

As is apparent from the drawing, the tubular connection 11 between the discharge end of the receiver 7 and the fine comminuting means 8 may communicate with a metering device 12 which delivers metered amounts of additional ingredients such as spices, spice solutions, or the like into the mixture which flows from the receiver 7 to the fine comminuting means 8, and, if desired several metering supply devices 12 may be provided for supplying additional ingredients in this manner to the mixture, and of course the additional ingredients supplied in this way will be thoroughly mixed as well as treated in the fine comminuting means 8 with the remaining ingredients before the final mixture is delivered to the receiver 10.

In accordance with the present invention each of the supply means 6 is adjustable by an adjusting means so that a plurality of adjusting means respectively cooperate with the plurality of supply means 6, and it is this individual adjusting of the several supply means 6 which controls the proportions of the ingredients to each other in the total mixture. The plurality of adjusting means respectively cooperate with the plurality of supply means 6 for adjusting the amounts of ingredients delivered thereby to the common receiver 7, so that it is by adjusting the plurality of supply means 6 that the ratio of the several ingredients to each other is determined, and in this way it is possible to do away with expensive and delicate scales for weighing the different ingredients, such scales giving rise to frequent breakdowns as well as being inconvenient to operate.

Thus, it will be seen that in the particular example of FIGS. 1 and 2 a slide valve 13 is located at the discharge end of each comminuting means 5 for controlling the passage through which the material flows from the comminuting means 5 into the supply means 6. In other words the cross sectional area of the inlet end of each supply means 6 is controlled by a slide valve 13 which is simply in the form of a slidable plate member capable of being shifted so as to regulate the cross sectional area of the inlet of each supply pipe 6 so as to control the amount of material which flows into each supply pipe 6 from the comminuting means 5 to which it is connected. In this way it is possible for the operator to set the several adjusting means 13 according to the desired proportions of the ingredients, and it will be noted that the handles of the adjusting means 13 will project to different extents from the devices 5 in accordance with the settings of the adjusting means 13, so that these handles can carry suitable scales cooperating with a stationary index carried by the particular comminuting means 5 and indicating to the operator the amounts for which the adjustments are set. Thus, through this simple expedient the several supply means 6 are capable of being independently adjusted to control the amounts of the ingredients which flow therethrough into the common receiver 7, and thus it becomes possible to do away with weighing scales or the like while at the same time guaranteeing the desired proportions of the mixtures and of course providing the possibility of any change in the proportions whenever desired.

As is diagrammatically indicated each comminuting and mixing means 5 is driven by its own motor 14, and it is also possible to adjust the motor 14 through a suitable variable resistor, or the like, so that it will drive the particular comminuting and mixing means 5 at a rate which will increase or decrease the amount of material delivered to the particular supply means 6, so that in this way also it is possible to control the supply of ingredients to the common receiver 7 so that they will have predetermined proportions to each other in the final mixture, and the adjustment provided through the electric motor 14 may be used together with the adjustment provided by the supply valve 13 or even separately from the latter, in which case the supply valve 13 would be eliminated.

As is indicated in FIG. 1 in particular, electrical conductors 15 and 16 extend between the driving motors for the screw conveyers 4 on the one hand, and the comminuting and mixing devices 5 as well as the adjusting means 13 on the other hand, and these electrical connections are connected through respective variable resistors 13', 14' or the like to the several motors of the screw conveyers so as to adjust the latter in accordance with the setting of the slide valves 13 or motors 14 or both, where both of these devices are adjusted as described above, and in this way it is possible to control the rate of supply of the ingredients by the plurality of conveyer means to the several comminuting and mixing means 5 in accordance with the rate at which the ingredients are delivered from the latter to the several supply means 6, so that a condition of over feeding or under feeding of ingredients to the several conveying and mixing means 5 can be reliably avoided.

Thus, it is apparent from FIGS. 1 and 2 that in accordance with the invention it is possible to do away completely with weighing scales which are particularly expensive as well as delicate in operation. All that is required in order to make a mixture such as a meat mixture for hamburger or the like is the necessary components such as, for example, beef, pork, and bacon which are supplied to the receptacles 1, 2, 3, respectively. From these receptacles the different ingredients are conveyed by the plurality of conveyer means 4 to the several combined comminuting and mixing means 5, respectively, and at the several comminuting and mixing means 5 it is possible to add, as desired, through suitable conduits 17 which lead into the several comminuting and mixing means, respectively, ice water, solidified frozen liquid such as water in the form of a snow, or the like. Thus, as may be seen particularly from FIG. 2 a plurality of supply conduits 17 respectively lead into the several means 5 so that through these conduits it is possible to add to the ingredients received from the conveyer means 4 materials such as ice water. The several ingredients which are thus comminuted and/or mixed within the several means 5 are delivered separately to the several supply means 6 which respectively communicate with the several means 5, and this plurality of separate supply means 6 respectively deliver the ingredients separately to the receiver 7 from which the ingredients are conveyed in the manner described above. The passage of the material through each supply means 6 is regulated by adjusting the position of the plate 13 or by regulating the speed of rotation of the motor 14, for example, or both, and the adjustment is made in such a way that in the receiver 7 the individual ingredients are delivered in the desired proportions. The electrical connections 15 and 16 enable the several screw conveyers 4 to be driven in a manner consistent with the rate of supply of the ingredients to the receiver 7.

The receiver 7 in which the material is thoroughly mixed with all the ingredients received from the several supply means 6 and with the addition of spices, ice water, or the like from the metered pumps 12, delivers the thoroughly mixed ingredients to the fine comminuter 8 which further comminutes the material and delivers it to a further mixer 9 which passes the material on to a receiver 10, and the material passes continuously through the mixer 9 which can have additional large-grained ingredients added to the mixture in the mixer 9 such as, for example, additional pieces of bacon or meat.

In the embodiment of the invention which is illustrated in FIGS. 3 and 4, the several conveyer means 4 deliver the material into a common comminuting and mixing means 5 in which all of the delivered ingredients are combined and from which the complete total mixture can be derived in the desired degree of fineness. With this embodiment suitable slide valves or the like cooperate with the outer casings of the screw conveyers 4 for controlling the cross sectional area through which the materials pass through the conveyers 4, so that in this embodiment it is the several conveyers 4 which form the supply means which are respectively adjustable for delivering the ingredients in desired, predetermined proportions to the common receiver which in this embodiment takes the form of the single comminuting and mixing means 5. Of course, instead of controlling the cross sectional area of the several conveyers 4, it is possible to control the speed of rotation of the driving motors therefor, as by connecting suitable variable resistors into the circuits of the several driving motors, so that in this way also it is possible to control the proportions of the various ingredients with respect to each other when they are delivered to the common receiver 5 of the embodiment of FIGS. 3 and 4.

It will be noted that with the simplified embodiment of FIGS. 3 and 4 it is also possible to eliminate the expensive, delicate weighing scales while still being capable of providing in a continuous manner a mixture of desired proportions of ingredients.

It will be understood that each of the elements described above, or two or more together, may also find a useful application in other types of comminuting and mixing assemblies differing from the types described above.

While the invention has been illustrated and described as embodied in comminuting and mixing assemblies for meats and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a comminuting and mixing assembly, in combination, a plurality of comminuting means for respectively comminuting a plurality of ingredients; a plurality of supply means respectively communicataing with said plurality of comminuting means for receiving the comminuting ingredients therefrom; a common receiver with which all of said plurality of supply means communicate for delivering the ingredients received from said plurality of comminuting means to said common receiver; and a plurality of adjusting means respectively cooperating with said plurality of supply means for controlling the amount of ingredients respectively delivered thereby to said receiver, so that the proportions of the ingredients to each other in said receiver is controlled according to the adjustments made by said plurality of adjusting means.

2. In a comminuting and mixing assembly, in combination, a plurality of comminuting means for respectively comminuting a plurality of ingredients; a plurality of supply means respectively communicating with said pluarility of comminuting means for receiving the comminuting ingredients therefrom; a common receiver with which all of said plurality of supply means communicate for delivering the ingredients received from said plurality of comminuting means to said common receiver; and a plurality of adjusting means respectively cooperating with said plurality of supply means for controlling the amount of ingredients respectively delivered thereby to said receiver, so that the proportions of the ingredients to each other in said receiver is controlled according to the adjustments made by said plurality of adjusting means, each of said adjusting means including a valve controlling the flow of each ingredient from the comminuting means to the supply means therefor.

3. In a comminuting and mixing assembly, in combination, a plurality of comminuting means for respectively comminuting a plurality of ingredients; a plurality of supply means respectively communicating with said plurality of comminuting means for receiving the comminuting ingredients therefrom; a common receiver with which all of said plurality of supply means communicate for delivering the ingredients received from said plurality of comminuting means to said common receiver; and a plurality of adjusting means respectively cooperating with said plurality of supply means for controlling the amount of ingredients respectively delivered thereby to said receiver, so that the proportions of the ingredients to each other in said receiver is controlled according to the adjustments made by said plurality of adjusting means, each of said adjusting means including a valve controlling the flow of each ingredient from the comminuting means to the supply means therefor, each valve means controlling the cross sectional area of the path of flow for each ingredient from the comminuting means therefor to the supply means therefor.

4. In a comminuting and mixing assembly, in combination, a plurality of comminuting means for respectively comminuting a plurality of different ingredients; a plurality of conveyor means respectively cooperating with said plurality of comminuting means for conveying the different ingredients respectively thereto; a plurality of drive means respectively connected operatively to said plurality of conveyer means for respectively driving the same; a plurality of supply means respectively communicating with said plurality of comminuting means for respectively receiving the comminuting ingredients therefrom; a receiver with which said plurality of supply means all communicate for supplying the different ingredients respectively thereto; and a plurality of adjusting means respectively cooperating with said plurality of supply means for respectively adjusting the amounts of ingredients respectively supplied thereby so that the proportions of the ingredients to each other in said receiver are controlled by said plurality of adjusting means, said plurality of adjusting means being respectively connected operatively to said plurality of drive means for respectively regulating the latter to drive said plurality of conveyer means in a manner supplying the ingredients to said plurality of comminuting means at a rate conforming to the amounts of said ingredients supplied by said supply means to said receiver.

5. In a comminuting and mixing assembly, in combination, a plurality of comminuting means for respectively comminuting a plurality of different ingredients; a plurality of supply means respectively communicating with said plurality of comminuting means for respectively receiving the ingredients therefrom; a common receiver with which all of said supply means communicate for delivering the ingredients thereto respectively from said plurality of comminuting means; a plurality of adjusting means respectively cooperating with said plurality of supply means for respectively adjusting the latter to control the amounts of said ingredients supplied thereby, whereby proportions of all of the ingredients received in the common receiver will be controlled by the adjustments of said plurality of supply means by said plurality of adjusting means, respectively; mixing means cooperating with said receiver for mixing the ingredients received therein; and delivering means receiving the mixed ingredients from said receiver and delivering the mixed ingredients to a further location.

6. In a comminuting and mixing assembly, in combination, a plurality of comminuting means for respectively comminuting a plurality of different ingredients; a plurality of supply means respectively communicating with said plurality of comminuting means for respectively receiving the ingredients therefrom; a common receiver with which all of said supply means communicate for delivering the ingredients thereto respectively from said plurality of comminuting means; a plurality of adjusting means respectively cooperating with said plurality of supply means for respectively adjusting the latter to control the amounts of said ingredients supplied thereby, whereby proportions of all of the ingredients received in the common receiver will be controlled by the adjustments of said plurality of supply means by said plurality of adjusting means, respectively; mixing means cooperating with said receiver for mixing the ingredients received therein; delivering means receiving the mixed ingredients from said receiver and delivering the mixed ingredients to a further location; and additional supply means cooperating with said delivering means for delivering to the latter additional ingredients which are delivered together with the mixed ingredients received from said receiver to said further location.

7. In a mixing and comminuting assembly, in combination, a plurality of screw conveyers for respectively conveying different ingredients; a plurality of electric motors respectively connected to said screw conveyers for driving the latter; a plurality of comminuting means respectively communicating with said screw conveyers for receiving the ingredients therefrom and comminuting said ingredients; a plurality of supply means respectively receiving the comminuted ingredients from said plurality of comminuting means; a single receiver with which all of said supply means communicate for delivering all of the ingredients thereto; a plurality of adjusting means respectively cooperating with said plurality of supply means for respectively adjusting the latter to adjust the amount of ingredients delivered by the plurality of supply means, whereby the proportions of the ingredients to each other in the single receiver will be determined according to the adjustments made by said plurality of adjusting means; and electrical means respectively interconnecting said plurality of adjusting means with said plurality of motors for adjusting the latter according to the adjustments of said plurality of adjusting means to drive the plurality of screw conveyers at a rate which will deliver the ingredients to said plurality of comminuting means in accordance with the amounts of the ingredients supplied by said supply means.

8. In an apparatus for comminuting and mixing a plurality of ingredients, in combination, a plurality of comminuting devices; a common receiver; a plurality of supply pipes respectively leading from said plurality of comminuting devices to the common receiver for respectively delivering separate ingredients respectively from the plurality of comminuting devices to the common receiver; a plurality of cross-section adjusting means respectively cooperating with said pipes for adjusting the cross-sectional area thereof through which the material flows to the common receiver; a plurality of motor means respectively connected operatively to the plurality of comminuting devices for respectively driving the same, so that each comminuting device has a motor means and a cross-section adjusting means cooperating therewith; and an adjusting means operatively connected to one of the means of each comminuting device for adjusting said one means to control the amount of material delivered through each supply pipe to the receiver, so that the proportions of the ingredients to each other can be regulated.

9. In a comminuting and mixing assembly, in combination, a plurality of comminuting devices; a plurality of supply means communicating with said plurality of comminuting devices for respectively receiving ingredients therefrom; a common receiver to which the several supply means deliver the different ingredients; an electric motor operatively connected to each comminuting means for driving the same; a plurality of conveyers respectively communicating with said plurality of comminuting means for delivering the ingredients thereto; a plurality of drive means respectively cooperating with said plurality of conveyer means for driving the same; and means connecting said plurality of motors to said plurality of drive means for operating the latter in accordance with the adjustment of the plurality of motors, whereby when the plurality of motors are adjusted to control the rate of flow of materials through the several supply means the drives of the several conveyers will also be adjusted accordingly.

References Cited by the Examiner

UNITED STATES PATENTS

| | | | |
|---|---|---|---|
| 1,608,718 | 11/26 | Boyle et al. | 241—34 |
| 2,873,955 | 2/59 | Sauer | 259—154 |
| 3,027,099 | 3/62 | Ludwig | 241—33 |

J. SPENCER OVERHOLSER, *Primary Examiner.*